(12) United States Patent
Bago et al.

(10) Patent No.: US 10,663,046 B2
(45) Date of Patent: May 26, 2020

(54) BALL SCREW LOCKING APPARATUS

(71) Applicant: Linear Transfer Automation, Barrie (CA)

(72) Inventors: Julius Gyula Bago, Barrie (CA); Nicholas Alexander Wagar, Midhurst (CA)

(73) Assignee: Linear Transfer Automation, Barrie, Ontario ( * ) Notice: Subject to any disclaimer, the term of this patent is extended or adjusted under 35 U.S.C. 154(b) by 0 days.

(21) Appl. No.: 15/278,884

(22) Filed: Sep. 28, 2016

(65) Prior Publication Data

US 2018/0087637 A1 Mar. 29, 2018

(51) Int. Cl.
*F16H 25/00* (2006.01)
*F16H 25/24* (2006.01)
*F16H 25/22* (2006.01)

(52) U.S. Cl.
CPC ..... *F16H 25/2454* (2013.01); *F16H 25/2204* (2013.01)

(58) Field of Classification Search
CPC ............ F16H 25/2454; F16H 25/2204; F16H 2035/005; B66F 3/44; B66F 3/14
USPC .............................................. 74/89.39, 411.5
See application file for complete search history.

(56) References Cited

U.S. PATENT DOCUMENTS

| | | | |
|---|---|---|---|
| 3,612,384 A * | 10/1971 | Loyd | B23B 31/26 228/102 |
| 3,995,722 A * | 12/1976 | Jones | F16D 55/22 188/170 |
| 4,563,908 A * | 1/1986 | Shube | F16H 25/20 185/40 R |
| 4,567,967 A * | 2/1986 | Crossman | B60T 8/325 188/161 |
| 4,635,883 A * | 1/1987 | Hamilton | B64C 1/22 244/137.1 |
| 5,057,061 A * | 10/1991 | Sakakibara | F16H 37/021 475/210 |
| 5,117,897 A * | 6/1992 | Robert | F22B 37/006 165/11.2 |
| 5,234,222 A * | 8/1993 | Hines | B23B 31/16241 279/126 |
| 5,501,123 A * | 3/1996 | Swann | B23Q 16/102 269/152 |
| 6,120,400 A * | 9/2000 | Onogi | F16H 55/56 474/30 |
| 6,698,565 B2 * | 3/2004 | Cool | F16H 48/08 180/248 |

(Continued)

*Primary Examiner* — Victor L Macarthur

(57) ABSTRACT

An apparatus for positively locking a ball screw in a lift position is described. The apparatus includes defined tooth disc and pawl housings, which interconnect to facilitate interoperation of locking components. A tooth disc is secured to the ball screw and actuators associated with each pawl can exert a downward force on each pawl, in order to force the pawls into engagement with the tooth disc via movement in a vertical plane. Owing to the shape, size and positioning of the pawl and tooth disc components relative to one another, and the vertical movement of the pawl members into engagement with the tooth disc, the apparatus of the present invention is capable of locking the hall screw in position at any point along the length of the ball screw, even if the pawls are out of alignment with the teeth, or recesses between adjacent teeth.

20 Claims, 14 Drawing Sheets

(56) References Cited

U.S. PATENT DOCUMENTS

| | | | | |
|---|---|---|---|---|
| 6,711,968 | B2* | 3/2004 | Krzesicki | F16H 48/19 74/650 |
| 6,722,485 | B1* | 4/2004 | Gitnes | B64C 13/28 188/82.2 |
| 6,805,653 | B2* | 10/2004 | Krzesicki | F16H 48/08 475/233 |
| 6,923,090 | B2* | 8/2005 | Blonski | F16H 27/06 74/436 |
| 7,293,500 | B2* | 11/2007 | Futamura | B30B 1/18 100/230 |
| 7,293,524 | B2* | 11/2007 | Darby | B64C 13/28 116/208 |
| 7,574,891 | B2* | 8/2009 | Futamura | B30B 1/18 100/280 |
| 7,728,477 | B2* | 6/2010 | Birdi | H02K 7/108 192/54.51 |
| 7,828,124 | B2* | 11/2010 | Sano | B60T 1/005 188/156 |
| 7,946,403 | B2* | 5/2011 | Burke | F16D 11/04 192/101 |
| 8,074,777 | B2* | 12/2011 | Birdi | F16D 11/04 192/101 |
| 8,613,683 | B2* | 12/2013 | Bidare | F03G 7/00 475/149 |
| 8,770,052 | B2* | 7/2014 | Nakatake | F16H 25/2209 74/424.82 |
| 9,863,515 | B2* | 1/2018 | Bernard | F16H 25/2454 |
| 2003/0084736 | A1* | 5/2003 | Darby | B64C 13/28 74/89.23 |
| 2004/0040813 | A1* | 3/2004 | Darby | F16D 41/02 192/46 |
| 2004/0065522 | A1* | 4/2004 | Gitnes | B64C 13/28 192/223.1 |
| 2004/0152556 | A1* | 8/2004 | Tomita | F16H 3/54 475/258 |
| 2006/0137596 | A1* | 6/2006 | Darby | B64C 13/28 116/230 |
| 2015/0267793 | A1* | 9/2015 | Bernard | F16H 25/2454 74/411.5 |
| 2016/0297514 | A1* | 10/2016 | Turpin | B64C 13/28 |
| 2016/0369877 | A1* | 12/2016 | Gitnes | F16H 25/2454 |
| 2017/0182646 | A1* | 6/2017 | Merello | B25F 3/00 |
| 2017/0299001 | A1* | 10/2017 | Trybula | B64C 5/00 |

* cited by examiner

BALL SCREW LOCKING APPARATUS

FIELD

The present disclosure relates to mechanical locking devices for industrial lift applications and in particular to a ball screw locking apparatus for use in locking a ball screw along a vertical plane.

BACKGROUND

Ball screws are mechanical linear actuators which translate rotational motion into linear motion (and vice-versa). In this regard, standard-type ball screws include a threaded shaft which interfaces with a ball nut via recirculating ball bearings. As well as being able to apply or withstand high thrust loads, they can do so with minimal friction. Ball screws are commonly used in industrial machining operations. In an example implementation, in a machine tool, or robotic assembly, lift action may be accomplished using a ball screw. For example, the ball screw may be oriented vertically and mounted to a lower frame of the tool (or machine or other assembly). A ball nut is mounted to the lifting frame which is the part that ends up moving up and down as the balls crew turns clockwise and counter-clockwise. Because ball screws are capable of spinning so freely (due to their low friction coefficient), if there was no torque on the ball screw to hold it in place, the machine would fall down. Because of this, torque must be applied to the ball screw at all times in order to maintain the position of the machine, for example, by application of torque applied by a motor. Motors employed for this purpose generally include a holding brake for use when power is turned off. This holding brake is a friction type brake. Secondary, redundant brakes may also be employed to hold the machine up when the power is off. These brakes are not used to slow down the machine, but only to hold the machine up when it has already stopped.

While backup friction braking systems may be sufficient in some ball screw applications, the limitations of friction braking systems are widely known in the art, wherein loss of friction will cause the machine to move from its stopped position along the length of the ball screw (in this regard, the ball screw may be back-driven due to its low internal friction due to a loss of friction in the braking mechanism). In order to ensure that a machine supported by a ball screw is positively locked when in a lift position, a novel locking mechanism is desired. In particular, a ball screw locking apparatus is desired wherein the ball screw is physically prevented from turning upon engagement of the locking apparatus.

SUMMARY OF INVENTION

In one embodiment, the ball screw locking apparatus of the present invention includes defined tooth disc and pawl housings, which interconnect to facilitate interoperation of locking components. A tooth disc is secured to the hall screw and actuators associated with each pawl can exert a downward force on each pawl, in order to force the pawls into engagement with the tooth disc via movement of each pawl within a vertical plane. The pawls are supported in the pawl housing by a plurality of guide members or guides, which prevent the pawls from being forced out of position within the pawl housing. Owing to the shape, size and positioning of the pawl and tooth disc components relative to one another, and the vertical movement of the pawl members into engagement with the tooth disc, the apparatus of the present invention is capable of locking the ball screw in position at any point along the length of the ball screw, whether or not the pawls are in or out of alignment with the teeth, or recesses between adjacent teeth, of the tooth disc.

BRIEF DESCRIPTION OF THE DRAWINGS

The embodiments herein will be understood from the following description with reference to the drawings, in which.

Figure 1:
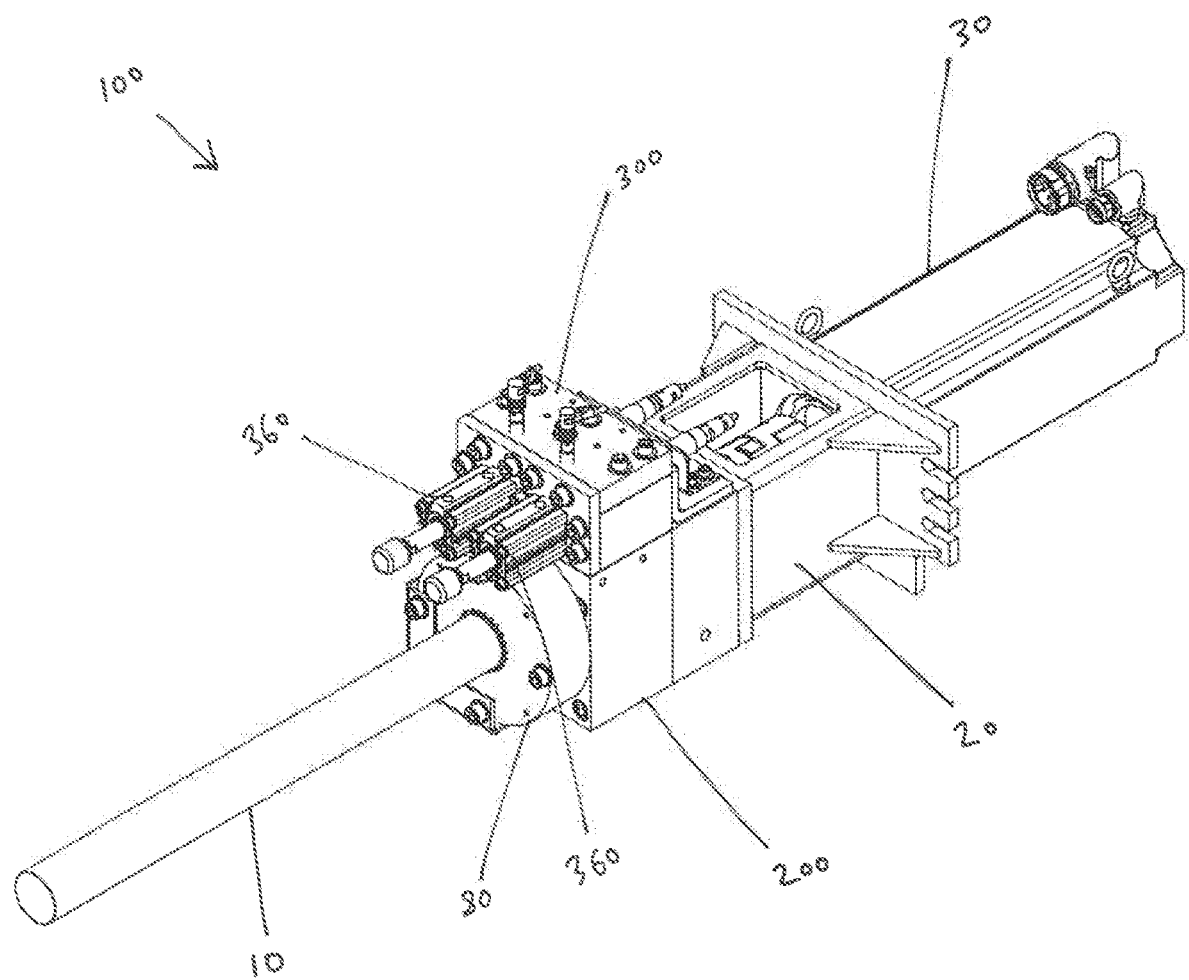
FIG. 1 is a perspective view of a ball screw locking apparatus in accordance with one embodiment of the present invention.

In the drawings, preferred embodiments of the invention are illustrated by way of example. It is to be expressly understood that the drawings are only for the purpose of illustration and as an aid to understanding, and are not intended as a definition of the limits of the invention.

DETAILED DESCRIPTION

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. In particular, all terms used herein are used in accordance with their ordinary meanings unless the context or definition clearly indicates otherwise. Also, unless indicated otherwise except within the claims the use of "or" includes "and" and vice-versa. Non-limiting terms are not to be construed as limiting unless expressly stated or the context clearly indicates otherwise (for example, "including", "having", "characterized by" and "comprising" typically indicate "including without limitation"). Singular forms included in the claims such as "a", "an" and "the" include the plural reference unless expressly stated or the context clearly indicates otherwise.

Now referring to the drawings, and initially to FIG. 1, in one embodiment, the present invention pertains to a ball screw locking apparatus 100, wherein a standard-type ball screw is shown generally by reference numeral 10. Recall that ball screws are efficient and if allowed to free fall, the masses they are attached to will cause the screw to spin in an uncontrolled and unsafe manner. While in operation, the motor uses torque to maintain ball screw position. When the motor is off, a secondary safety brake (or friction brake) must be engaged. In the event that the friction brake fails, the machine itself could be damaged by falling in an uncontrolled manner, and harm to human life may also result.

To clarify, the ball screw 10 does not form part of the present invention, however, the apparatus 100 of the present invention interoperates with the ball screw 10 in order to lock the ball screw in position on a machine (or other device or apparatus). In this regard, the housing components of the apparatus 100 are indicated generally by reference numerals 200 and 300, being a tooth disc housing and pawl housing, respectively. In this embodiment, the pawl actuators 360 are positioned outside, or substantially outside of the pawl housing 300. Note that reference numeral 20 refers to a coupling housing and reference numeral 30 refers to a general motor. To daffy, neither the coupling housing 20 nor motor 30 form part of the present invention, however, these components are referenced solely for the purpose of illustrating an example association between the apparatus 100, ball screw 10 and motor 30. In this regard, the coupling housing 20 encloses a coupling for connecting the motor 30 to the ball screw 10. The ball screw locking apparatus 100 of the present invention is intended for use in applications where positive locking of the ball screw 10 is desired, for example, in machine applications, where the ball screw 10 is used to support a machine in a vertical (or lift) position.

Figure 2:
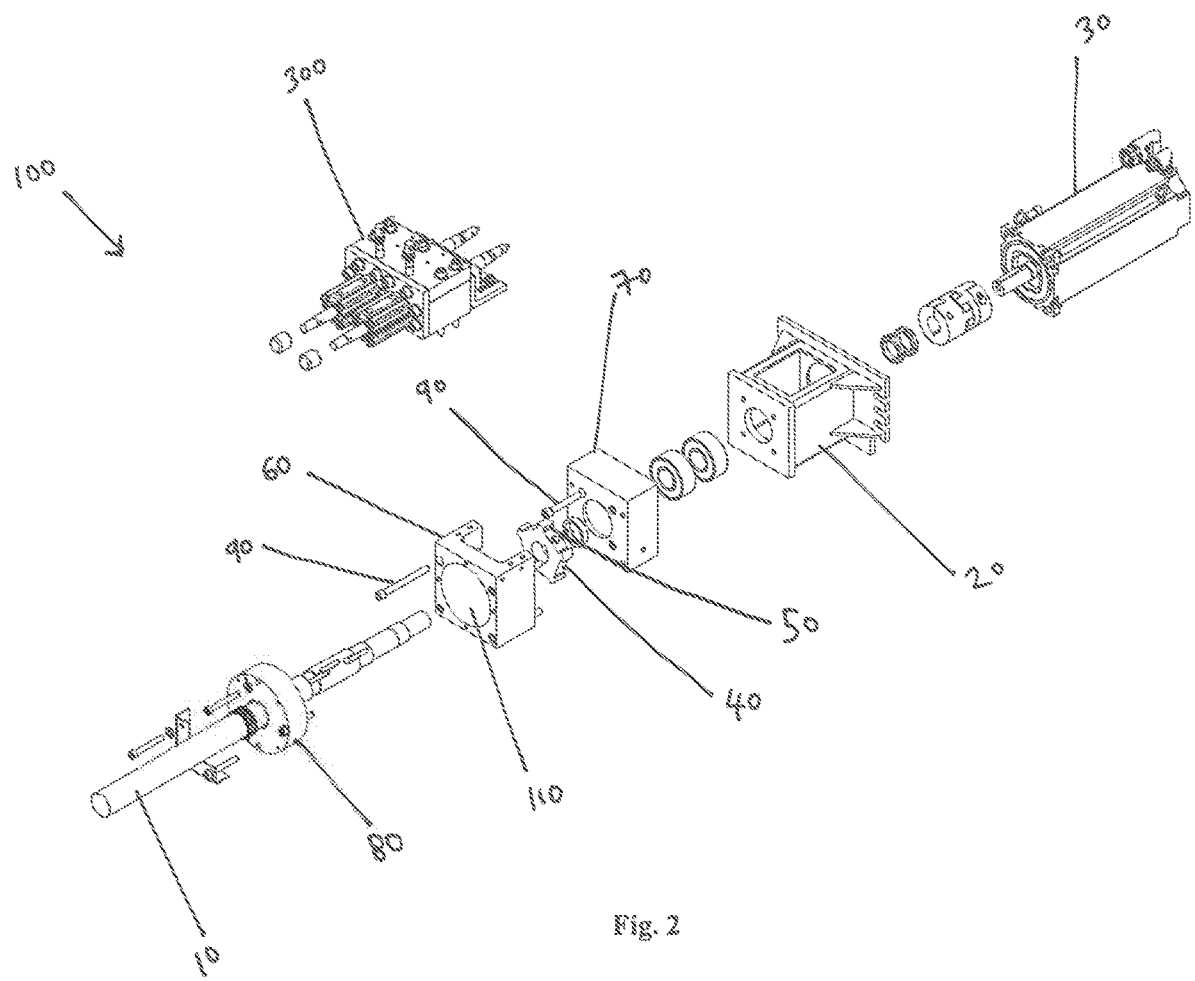
FIG. 2 is a partial exploded perspective view of the ball screw locking apparatus of FIG. 1.

Referring next to FIG. 2, in conjunction with FIG. 1, there is shown an illustration of a tooth disc 40 comprising a plurality of teeth 50, for insertion within the tooth disc housing 200. Between individual teeth 50 of the tooth disc 40 are recesses (or cavities) formed by the sidewall sections of adjacent teeth 50. In the embodiment shown, the tooth disc housing 200 is comprised of a first tooth disc housing component 60 and a second tooth disc housing component 70. The first tooth disc housing component 60 and second tooth disc housing component $0 may be fastened together by conventional means, such as via a series of bolt fittings 90. Note that any number of components could be employed to produce the tooth disc housing 200, and in this regard, the tooth disc housing embodiments described herein, and illustrated in the drawings, are not intended to be limiting.

Figure 7:
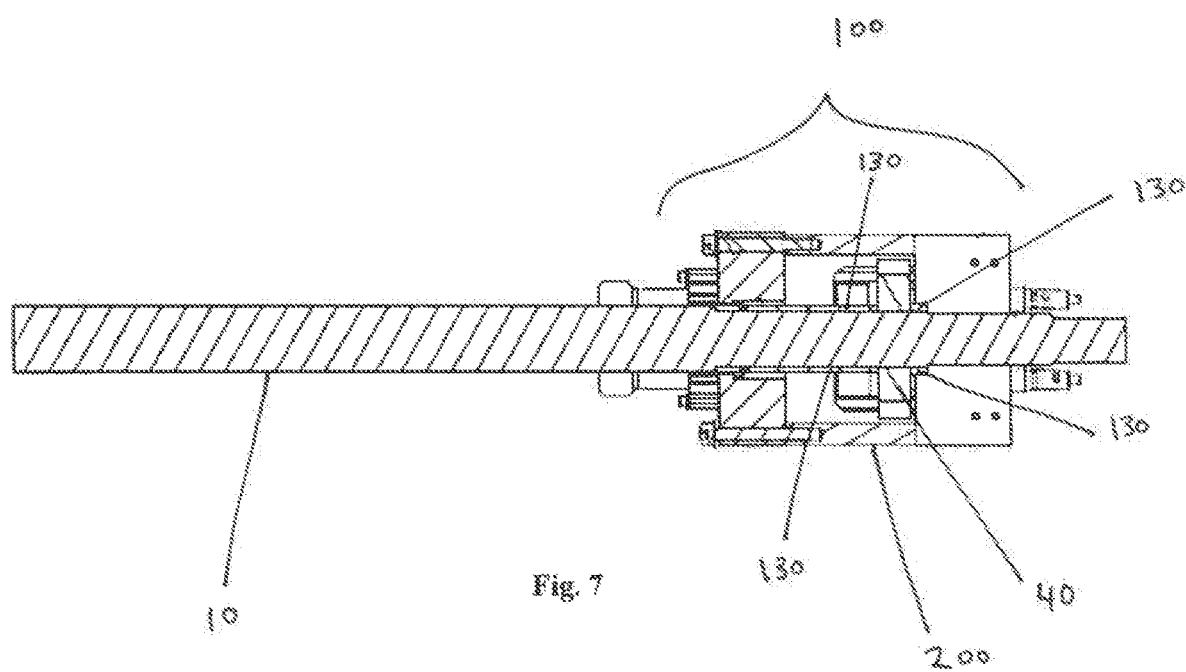
FIG. 7 is an alternate side partial cross-sectional view of the ball screw locking apparatus of FIG. 6 through line D-D.
Figure 8:
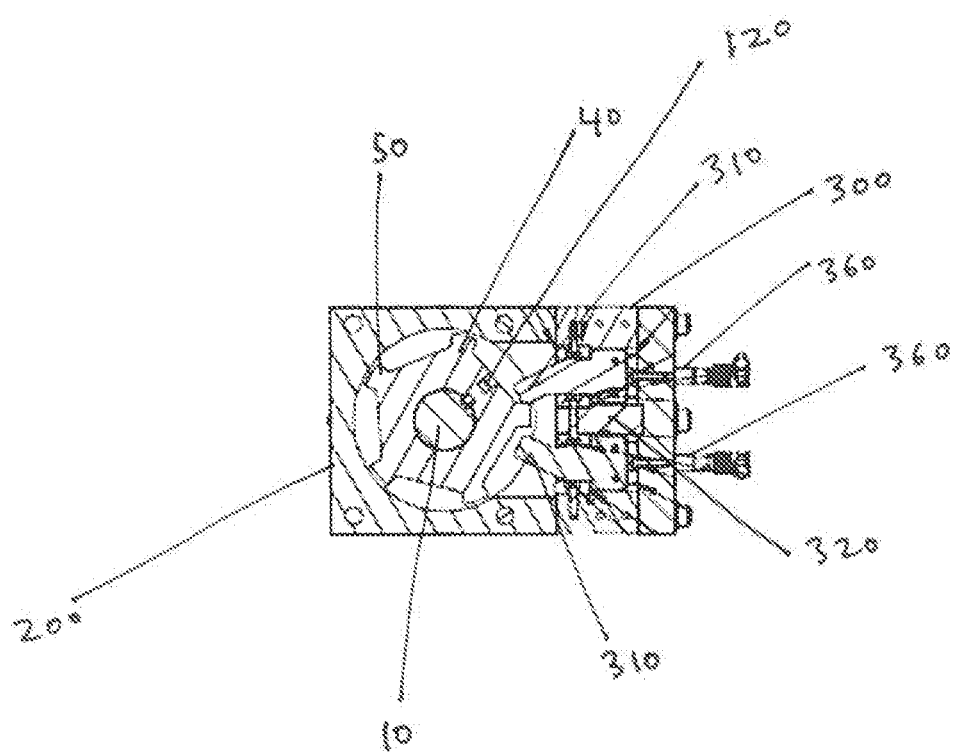
FIG. 8 is an alternate top plan cross-sectional view of the ball screw locking apparatus of FIG. 6 through line D-D.

In the tooth disc housing embodiment shown in FIG. 2, the first tooth housing component 60 includes an aperture 110 for facilitating insertion of an end of the ball screw 10 into the tooth disc housing 200. The tooth disc 40 is supported on the apparatus 100 within the tooth disc housing 200 and is affixed to the ball screw 10 via insertion of the ball screw 10 through a medial aperture positioned on the tooth disc 40 (for example, via a key member and key (not shown), wherein the key is held in place by a fastener, such as a bolt fastener (hereinafter referred to as a tooth disc fastener). The tooth disc fastener is best seen in FIG. 8 (indicated by reference numeral 120). As indicated in the drawings, the tooth disc 40 has an aperture, at or near its center, through which the tooth disc 10 can be positioned onto the ball screw 10. As its name implies, the tooth disc 40 comprises a plurality of teeth 50, or other flange portions, which extend outwardly from a planar surface of the tooth disc 40. The combined tooth disc ball screw assembly (40, 10) facilitates the transmission of torque onto the ball screw 10. In the embodiments shown, the tooth disc 40 is disposed within a housing 200. As depicted in FIG. 7, the tooth disc 40 is held in position between upper and lower spacers 130. Referring back to FIGS. 1 and 2, the tooth disc housing 200 also function to support a standard-type friction brake 80 (or other redundant brake) in position. In this regard, the friction brake 80 may be affixed directly to the tooth disc housing 200. Note that the friction brake 80 is shown for illustrative purposes and does not form part of the present invention (in this regard, it is anticipated that the majority of assemblies of a similar nature will include a friction brake 80). The friction brake 80 functions as an additional safety brake to inhibit movement of the ball screw, however, owing to its mechanical limitations, it widely acknowledged in the art that standard-type friction brakes 80 are vulnerable to failure.

Figure 3:
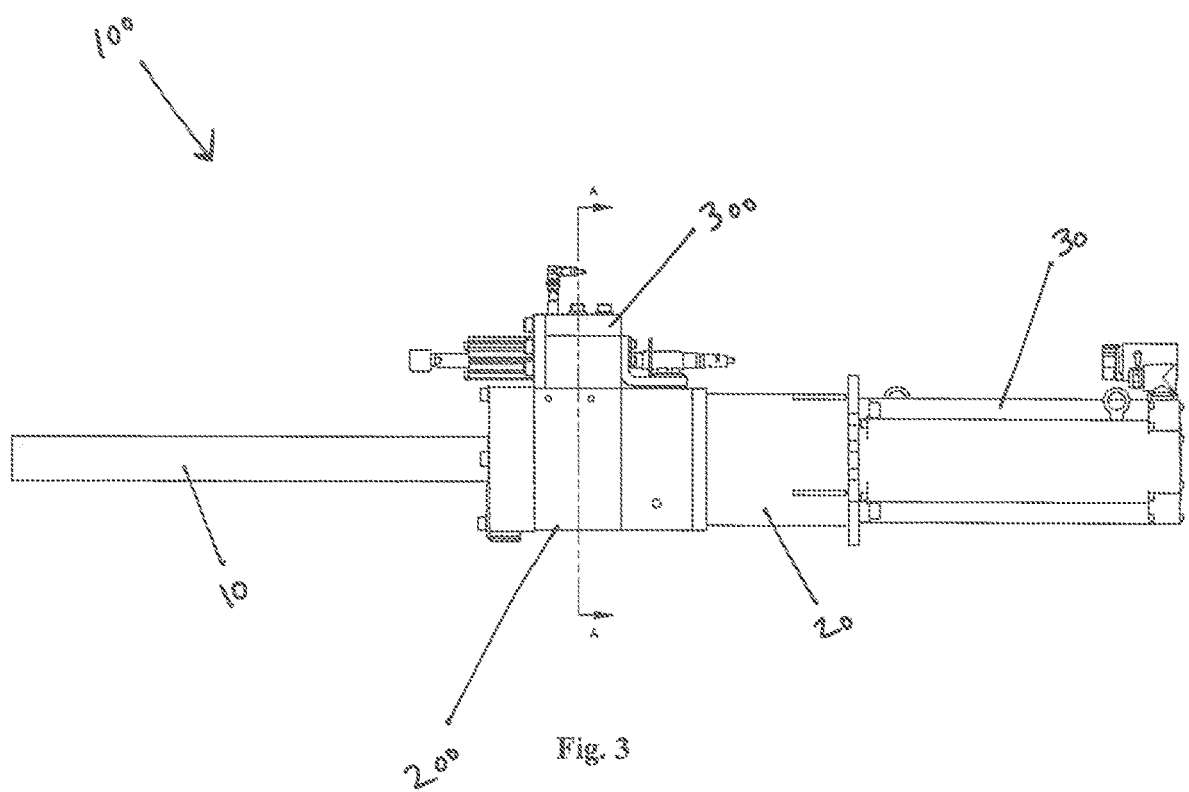
FIG. 3 is a right side elevation view of the ball screw locking apparatus of FIG. 2.

Still referring to FIGS. 1 and 2, the pawl housing 300 is shown as a defined housing, separate and apart from the tooth disc housing 200. The pawl housing encloses the pawl components (not shown), which components interoperate with the tooth disc 40 in order to achieve positive locking function. FIG. 3 depicts a side elevation view of the apparatus 100, showing the relative positioning of the tooth disc housing 200 and the pawl housing 300. It is preferable to utilize a separate housing for each of the tooth disc and pawl components, since a unitary housing represents a more complicated machine part, which cannot be as easily manufactured or as readily disassembled as a multi-component housing. In this way, having multiple housings (for the tooth disc and pawls) will facilitate a more efficient and economical assembly of parts, and easier repair of components, as compared to a unitary housing arrangement.

Figure 4:
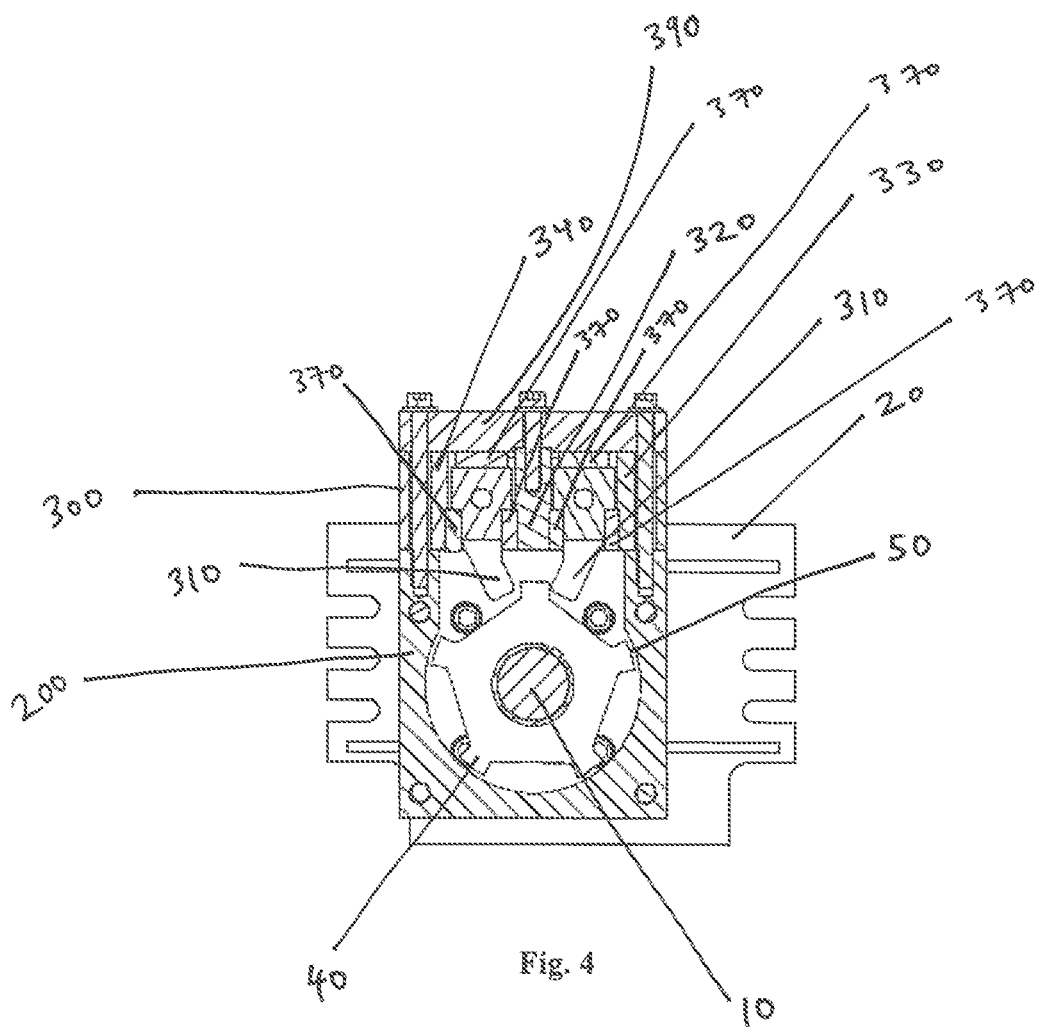
FIG. 4 is top plan cross-sectional view of the ball screw locking apparatus of FIG. 3 through line A-A.

Next referring to FIG. 4, there is shown a cross-sectional diagram of the combined tooth disc housing 200 and pawl housing 300. The housings 200, 300 may be secured together by conventional means, such that pawl components 310 are presented for interoperation with the tooth disc 40. In this regard, reference numeral 310 refers to an at least one pawl component, or pawl. Each of the at least one pawls 310 is designed to interact with the tooth disc 40. In the embodiments depicted in the drawings, two pawls 310 are shown. It is preferred to employ two pawls 310 for the purposes of facilitating multiple positive locking arrangements. In particular, depending on the orientation of the tooth disc 40 and the lead-hand of the ball screw 10, in a two-pawl arrangement, torque can be transmitted into either pawl 310 as a tooth 50 of the tooth disc 40 makes contact with pawls 310.

Still referring to FIG. 4, in a two-pawl arrangement, the 310 are supported by and move between three guide members or guides 370 being a first side guide member, a second side guide member and an end guide member. The pawls 310 are supported by the guides 370, which are mounted within the pawl housing 300 using conventional means (e.g. using a plurality of bolts of which bolts). Note that each pawl 310 is supported by a plurality of guides 370. The guides 370 function to support the pawls 310 in two horizontal axes when force is applied to the tips of the pawls 310 by movement of the tooth disc 40. Note that in some orientations, only one pawl 310 may be engaged by the tooth disc 40 (this is explained in further detail below). Importantly, the guides 370 serve to prevent their associated pawls 310 from rotating out of position within the pawl housing 300, thereby maintaining strict alignment of the pawls 310 with the tooth disc 40 and its components.

Figure 6:
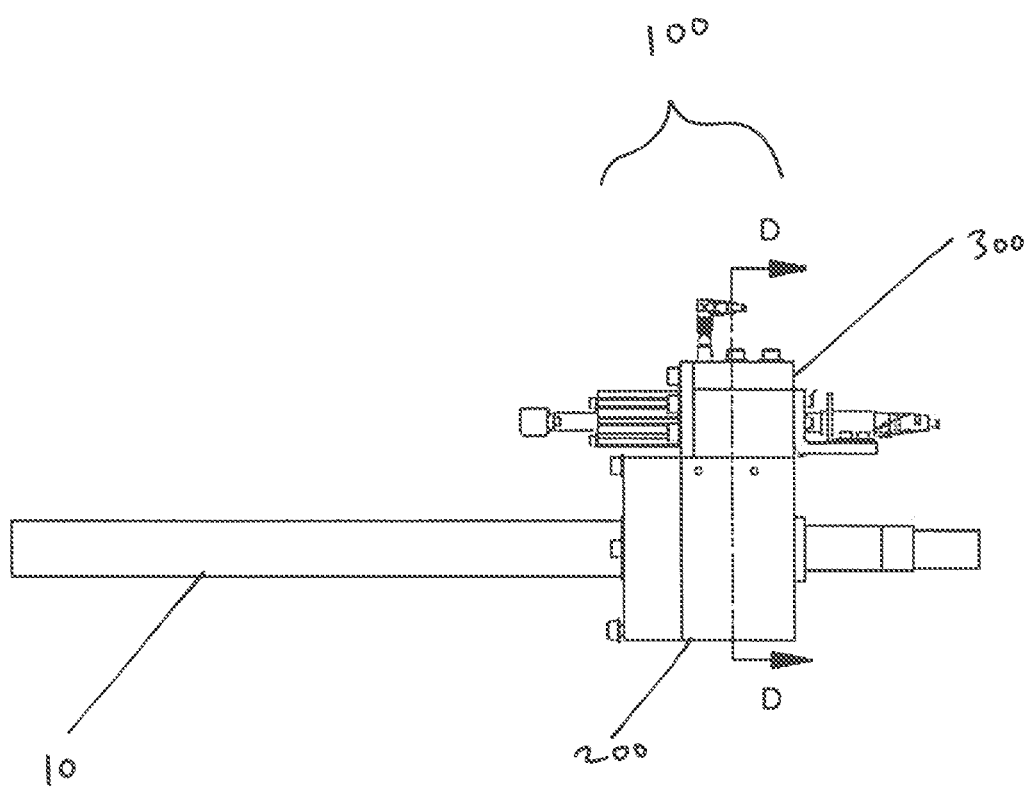
FIG. 6 is an alternate right side elevation view of the ball screw locking apparatus of FIG.

The guides 370 are mounted within the pawl housing 300. More particularly, in the illustrated embodiment, the guides are mounted to the components that make up the pawl housing 300, being two side plates 330, 340, an end plate 390, a center plate 320 and a top plate (not shown in FIG. 4). It must be understood that the pawl housing 300 can take many forms and in this regard, the pawl housing 300 can be composed of multiple components fastened together by conventional means, or of a single component of unitary construction. In the embodiments shown in FIGS. 6 and 7, the pawl housing side plates 330, 340, end plate 390, and center plate 320 are attached to a top plate (not shown), and in turn, the completed pawl housing 300 is affixed to the tooth disc housing 200. In these embodiments, the tooth disc housing 200 is mounted to the machine or other apparatus or device for which the ball screw locking apparatus is to be used and the pawl housing 300 is in turn aligned with the tooth disc housing 200 components in order to enable a locking function to be achieved. As will be explained in further detail below, in operation, the force applied from the tooth disc 40 to an at least one pawl 310 which is in turn supported by the guides (and such guides are fastened to the pawl housing 300 assembly, which in turn transfers the force into the disc housing 200). Since the pawls 310 are rigidly supported by the guides 320, 330, 340, no reasonable rotational force applied to the tooth disc 40 could push the pawls 310 out of their locked position.

Figure 5:
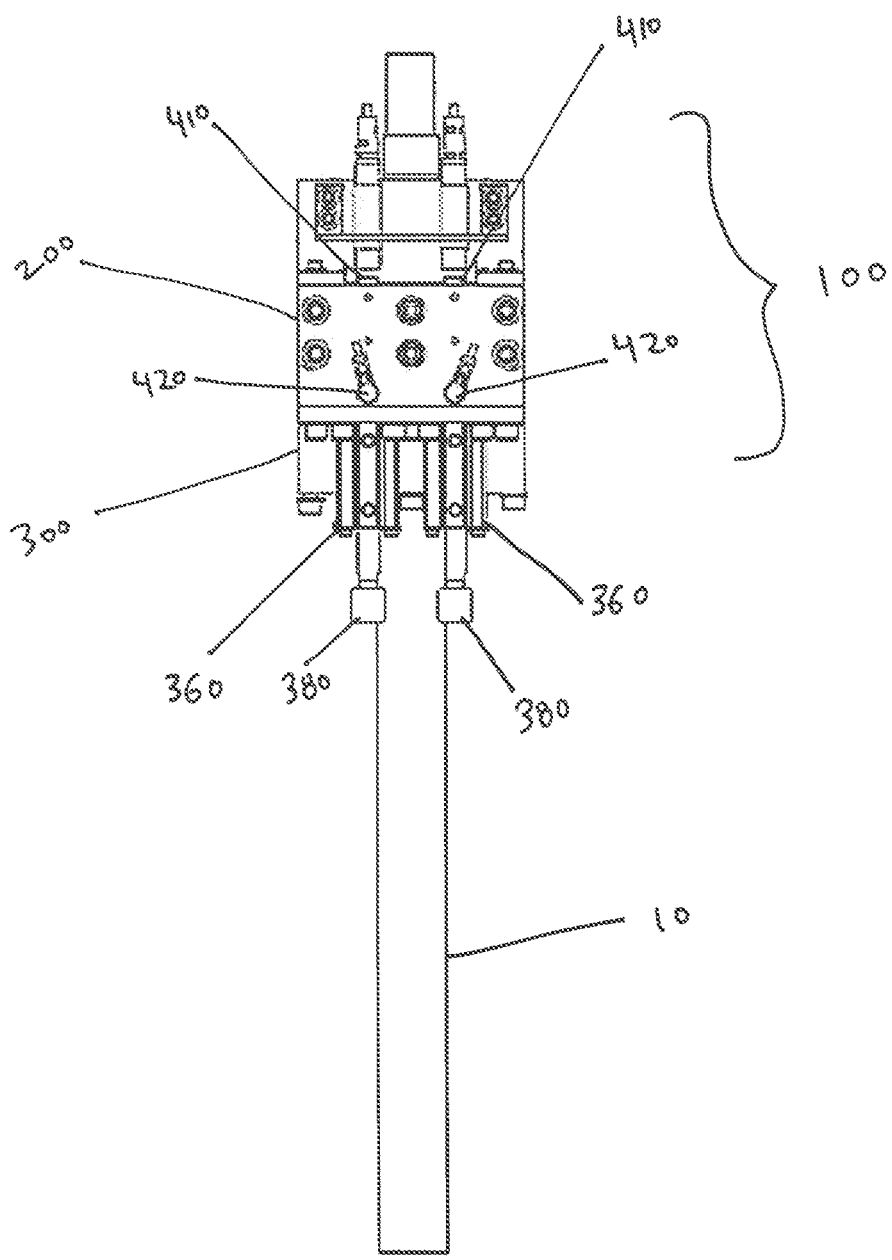
FIG. 5 is an alternate front elevation view of a ball screw locking apparatus in accordance with one embodiment of the present invention.
Figure 11:
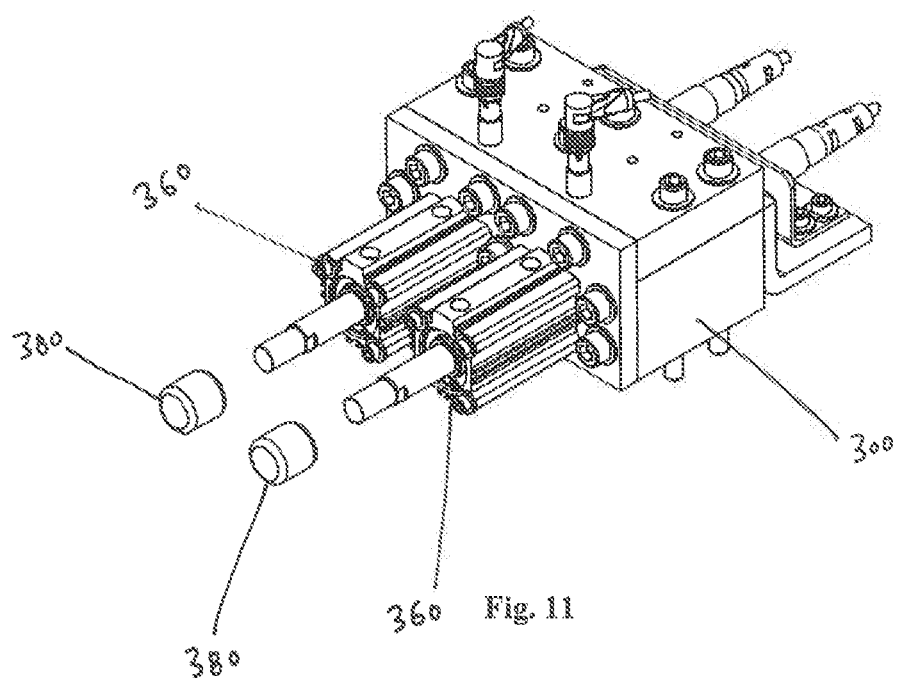
FIG. 11 is a perspective, partial exploded view of the pawl housing in accordance with one embodiment of the present invention.

Referring to FIG. 5, there is shown an at least one actuator 360 associated with each of the at least one pawls (not shown in FIG. 5). Optionally, a visual indicator 380 may be affixed to each actuator 360 (e.g. a visual indicated threaded onto an end of the actuator). In the event of a jam within the pawl housing 300, the visual indicator 380 can be used as a handle to disengage the actuator 360 components (such as cylinder rods) that are threaded into the pawls. Components 360 and 380 are also illustrated in detail in FIG. 11. Optionally, each pawl 310 may be associated with a safety sensor-sensor flag 42. These safety sensor-sensor flag pairs 410 monitor whether the associated pawl 310 is engaged or not. In addition, sensors 420 may be employed (each sensor 420 associated with a pawl 310), wherein each sensor 420 monitors the retract (or disengage) position of its associated pawl 310.

Figure 9:
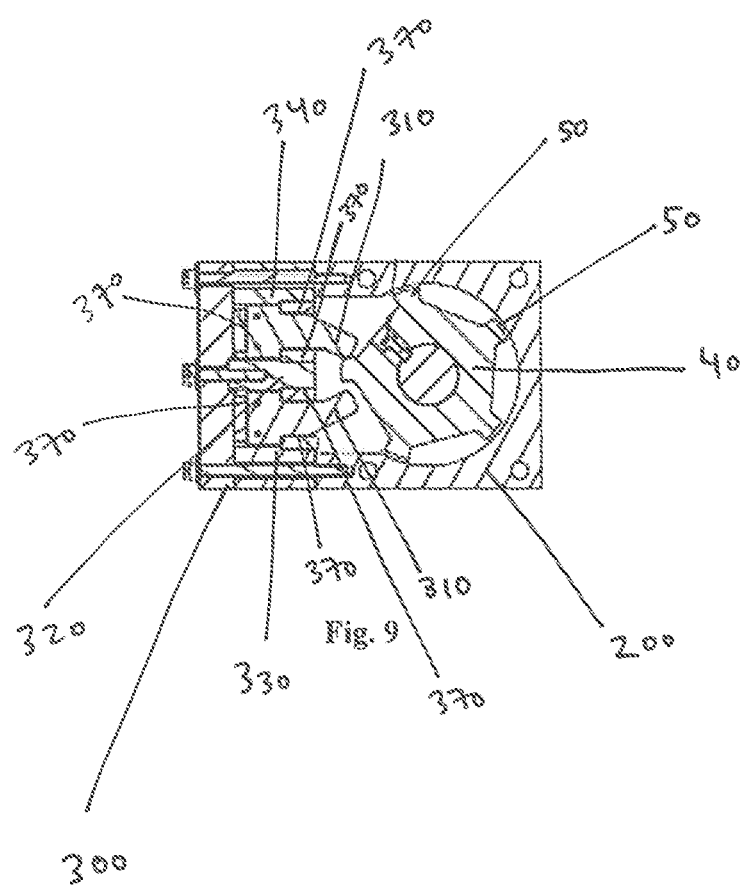
FIG. 9 is a further alternate top plan cross-sectional view of the ball screw locking, apparatus of FIG. 6 through line D-D.
Figure 10:
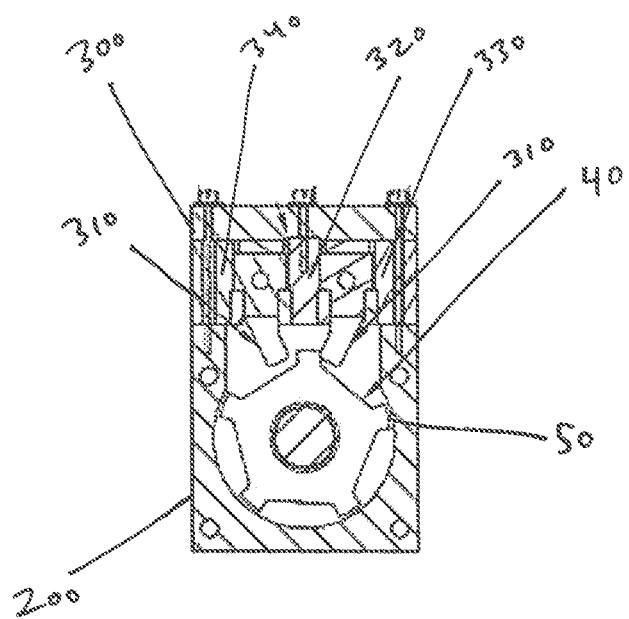
FIG. 10 is a further alternate top plan crams-sectional view of the hall screw locking apparatus of FIG. 6 through line D-D.

The actuator 360—pawl 310 relationship is illustrated in FIG. 8. In this regard, each actuator 360 functions to raise or lower its associated pawl 310 within a vertical plane, into an engaged or disengaged position with the tooth disc 40. Two different pawl-tooth disc engagements are shown in FIGS. 8 and 9, wherein in FIG. 8, it can be seen that only a first pawl 310 is engaged with a tooth 50 of the tooth disc 40. In FIG. 9, it can be seen that only a second pawl 310 is engaged with a tooth 50 of the tooth disc 40.

Importantly, the apparatus 100 of the present invention functions to prevent the ball screw 10 (or other shaft) from rotating in either direction when the locking mechanism of the apparatus 100 has been engaged. This, in turn, prevents the machine (or other device or apparatus) from falling down or rising up if a counterforce in either an up or down direction within the vertical plane of the machine is applied. The apparatus 100 of the present invention does not rely on friction to create a braking force, unlike most redundant brakes. This means that a scenario cannot arise where the friction material has deteriorated to a point where braking is non-functional.

Figure 12:
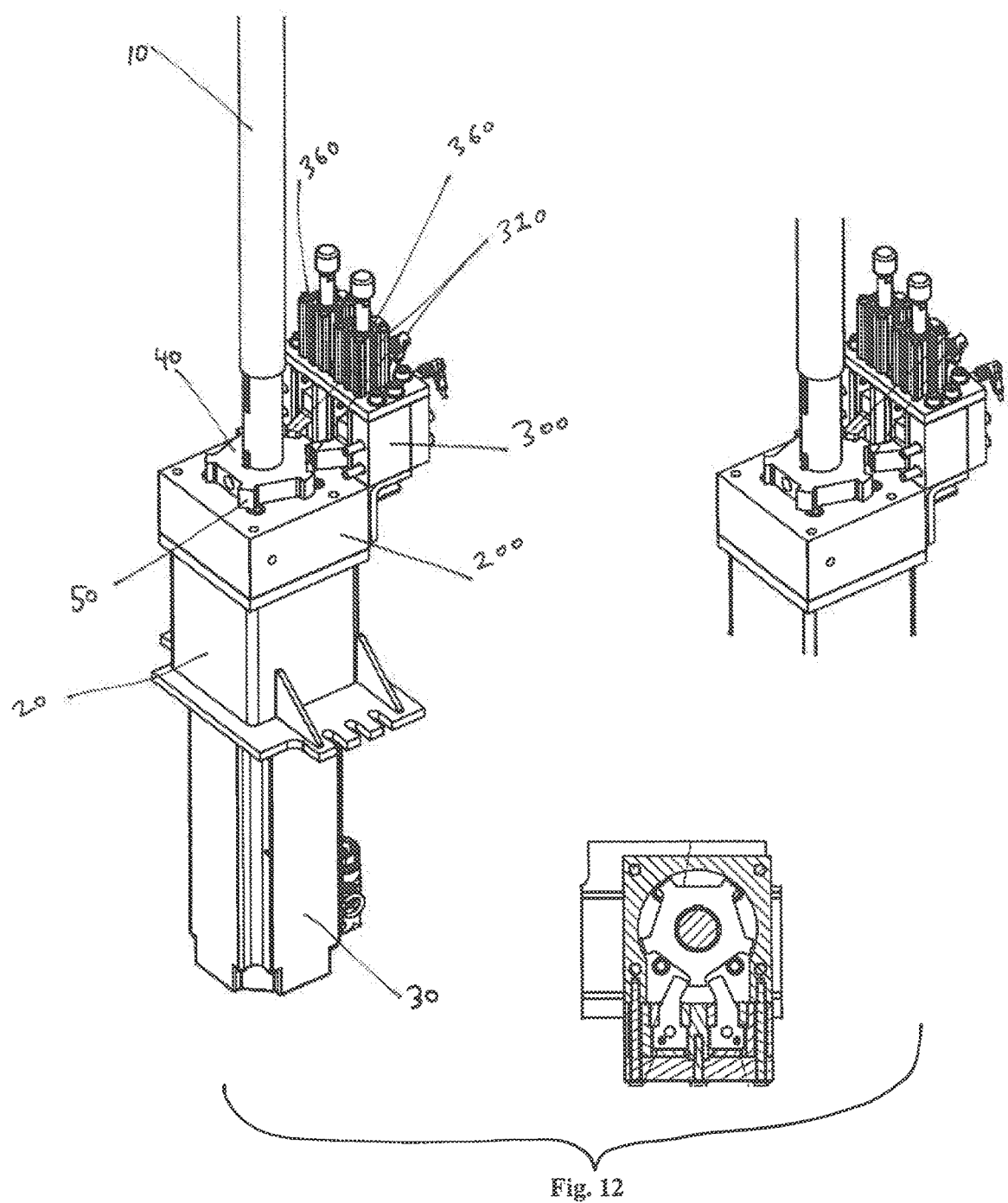
FIG. 12 illustrates perspective and cross sectional views of the ball screw locking apparatus of FIG. 1, showing engagement of two pawls with the tooth disc.
Figure 13:
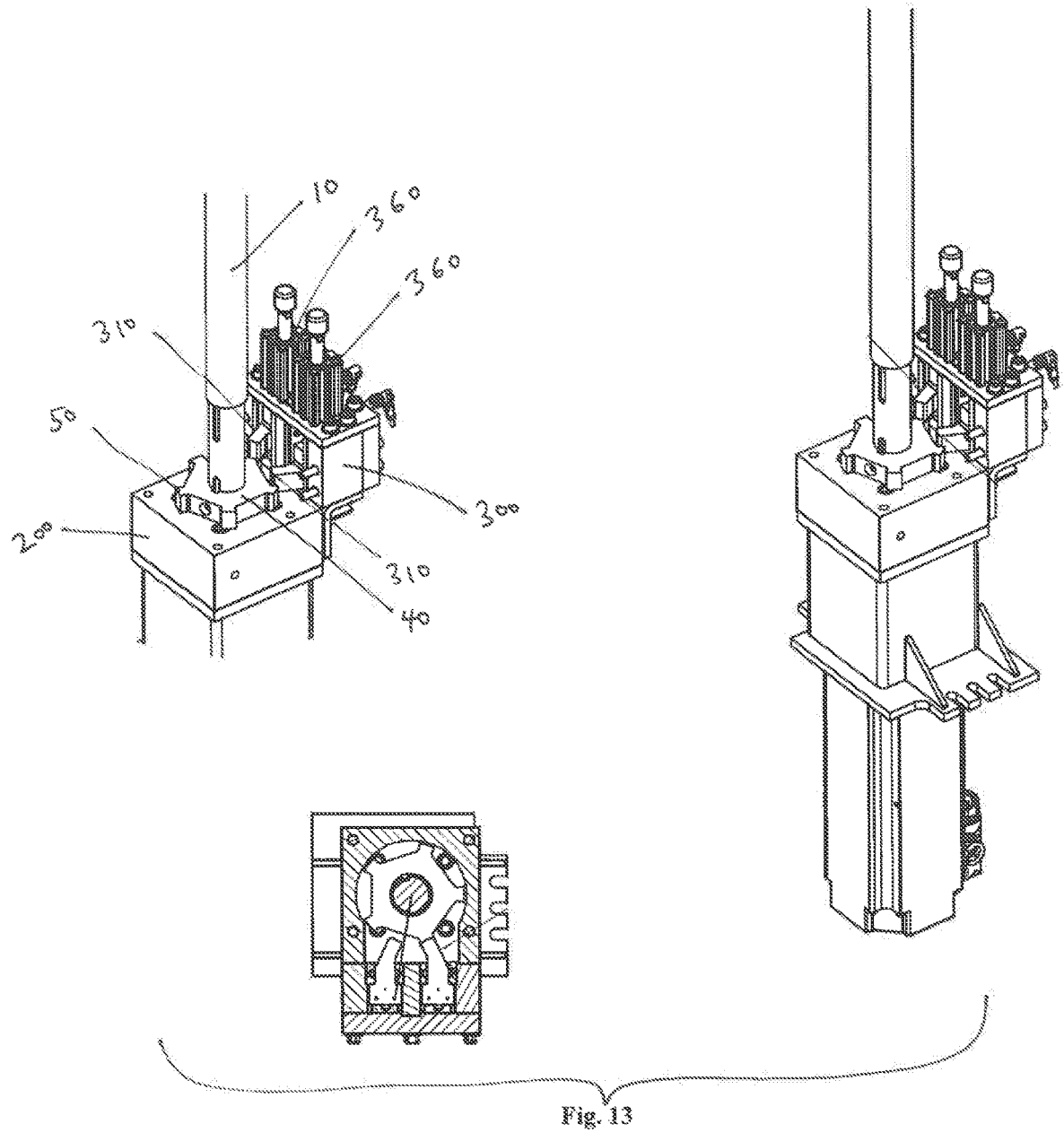
FIG. 13 illustrates perspective and cross sectional views of the ball screw locking apparatus of FIG. 1, showing engagement of one pawl with the tooth disc.
Figure 14:
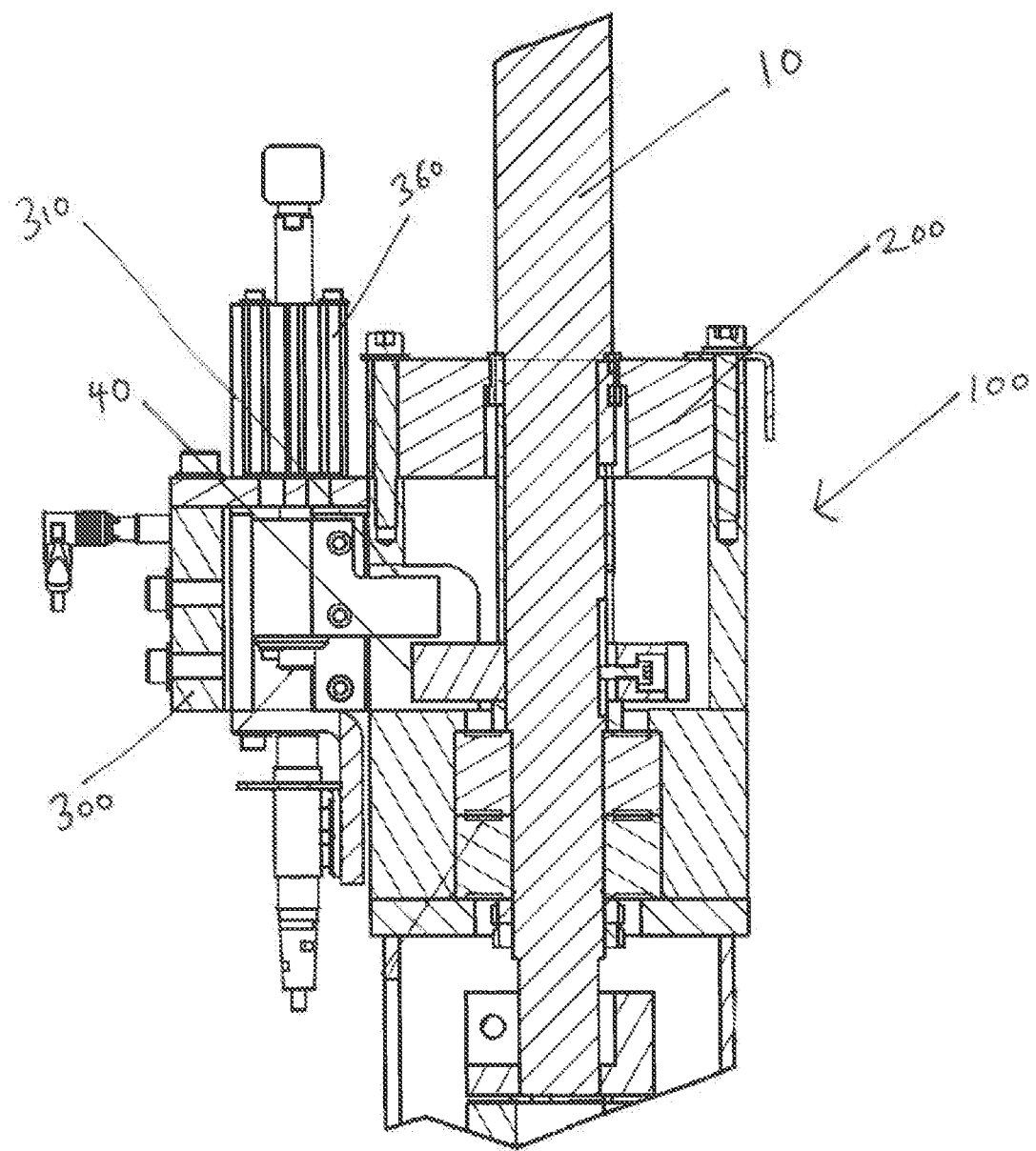
FIG. 14 is a partial side elevation, and partial cross-sectional, view of the ball screw locking apparatus of FIG. 1.

FIGS. 12 and 13 illustrate alternative pawl engagement orientations with the with the tooth disc 40. Note that components, including namely the housing 200, have been removed from FIGS. 12 and 13 for the sake of clarity. In FIG. 12, it can be seen that both pawls 310 of the pawl housing 300 have been forced into a downward position by operation of their associated actuators 360, such that both pawls 310 are in contact with a tooth 50 of the tooth disc 40, such that the outer vertical wall of the tooth disc 50 substantially overlaps with the outer vertical wall of each pawl 310. Substantial overlapping of these components results in the most secure locking of the ball screw 10 against rotational movement. In FIG. 13, it can be seen that a single pawl 310 has been forced into a downward position in which a portion of the pawl 310 abuts the outer vertical wall of the tooth 50. The second pawl 310 remains in a raised position, out of engagement with the tooth disc 40.

As depicted in FIG. 12, the engagement of a tooth 40 of the tooth disc 50 between two pawls 310 of the pawl housing 300 prevents the tooth disc 40 from moving in either direction. In the arrangement shown in FIG. 13, when a single pawl 310 engages the outermost facing portion of a tooth 40 of the tooth disc 50, the tooth disc 50 is similarly prevented from moving in either direction.

It is important to note that since the pawls 310 engage the tooth disc 40 via movement of each pawl up and down in a vertical plane, as opposed to horizontal movement of each pawl, the pawls 310 are not prone to inadvertent release from engagement with the tooth disc 40, for example, via high frequency vibrations within the machine to be locked in a lift position. In contrast, in a horizontal orientation (where the pawls 310 are made to slide into the teeth 50 by back and forth movement in a horizontal plane), the pawls are more prone to vibrate out of position. To prevent the pawls from moving out of alignment from the teeth of the tooth disc in a horizontal arrangement, additional stabilizing threes would need to be employed, for example, by inclusion of a spring tensioner for exerting supportive pressure on the pawls to assist in maintaining the pawls in position against the teeth of the tooth disc. Such spring tensioner, or similar component, will itself deteriorate through use over time and eventually fail.

It is further notable that in a horizontal application (in which the pawls would slide into the teeth over a horizontal plane), there is a plausible and material risk that the tooth on the disc could impart a load at an angle to the pawl which could in turn create a force tending to push the pawl out of engagement (for example, by application of a wedging force on the pawl). In the case of the present invention, the guides 370 function to maintain their respective pawls 310 in position between the guides 370, thereby preventing the pawls 310 from being forced out of their locked position.

As indicated in FIGS. 12 and 13, it is preferable that the height of each pawl 310 be the same or substantially the same as the height of the tooth 50 to be engaged. This configuration further supports the secure positioning of the pawls 310 (or pawl) against the teeth 50 (or tooth) of the tooth disc 40, and guards against pawl 'jump' caused by vibrations in the machine, which could otherwise force the pawls 310 (or pawl) out of alignment with the teeth 50 (or tooth) of the tooth disc 40.

The embodiments of the present invention also present advantages over a hypothetical pivoting pawl-ball screw lock assembly, since a pawl which pivots into engagement with a tooth of a tooth disc will only lock in one direction, and if the direction of force is changed, the pawl would pivot back in the direction of its resting position. A further detriment of the pivoting design is that once the pawl is engaged with the tooth disc, it cannot be disengaged and retracted without moving the machine itself, since in a pivoting arrangement, the pawl rotates past its center point to engage the tooth disc (similar to a cam-lock arrangement). Moreover, in a pivoting arrangement, the pawl would only lock the tooth disc in one direction, such that if the direction of force on the tooth disc is changed, the pawl would be forced out of engagement with the tooth disc. In turn, a pivoting arrangement would require at least four pawls (or two pawl pairs) in order to ensure that teeth of the tooth disc could be locked in position by oppositely oriented pawls, wherein the pawl pairs are doubled-up.

To clarify, the apparatus 100 of the present invention is used in a vertical application to positively lock the ball screw 10 and keep it from rotating without relying on friction or springs to maintain the locked position. The tooth disc 40 is physically connected or keyed to the ball screw 10 such that the tooth disc 40 spins as the ball screw 10 spins. Owing to the engagement of pawls 310 with a tooth 50 or teeth of the tooth disc 40, and in addition to the locking arrangement described above, at least the following general locking arrangements can occur:

1. One pawl is engaged between two teeth of the tooth disc and the second pawl is not engaged. In this state, the ball screw is locked.
2. One pawl is engaged between two teeth of the tooth disc and the second pawl is also engaged between two teeth of the tooth disc. In this state, the ball screw is locked.
3. Both pawls are engaged between two teeth of the tooth disc, with no tooth between the pawls. In this state, the ball screw is locked.
4. Both pawls are engaged on the same tooth of the tooth disc. In this state, the ball screw is locked.

When an individual pawl 310 is not engaged with the tooth disc 50, it may be forced back into its resting position by application of an upward tending force via its associated actuator 360.

Preferred tooth disc and pawl metrics can be seen in FIG. 4. In this regard, it is important that the individual teeth be sufficiently sized in order to accommodate the load generated by the pawls. In the embodiment shown in FIG. 4, the tooth disc 40 contains five (5) evenly spaced teeth 50 of equivalent, or near equivalent, shape and size. In addition, the spacing between pawl and tooth disc tooth must be such that in all scenarios one of the pawls will engage. In this regard, in order to ensure that the locking function of the apparatus can be engaged at any position along the length of the ball screw (i.e. such that locking is not confined to a home position, or other pre-set locking points) it is imperative that the space between the pawls 310 be wider than the width of the outer surface (or outside-to-outside dimension) of each tooth 50, and that the outside-to-outside dimension of the pawls 310 be small enough to fit between two adjacent teeth 40 of the tooth disc.

While one or more embodiments of this invention have been described above, it will be evident to those skilled in the art that changes and modifications can be made therein without departing from the essence of this invention. All such modifications are believed to be within the sphere and scope of the invention as defined by the claims appended hereto.

What is claimed is:

1. A ball screw locking apparatus for preventing a ball screw from moving rotationally, comprising:
    a. a tooth disc housing interconnected to a pawl housing;
    b. a plurality of pawl actuators disposed outside the pawl housing;
    c. at least two pawls disposed within the pawl housing, wherein each of the plurality of pawl actuators is associated with an at least one of the at least two pawls for controlling the movement of an at least one of the at least two pawls within a vertical plane;
    d. a tooth disc for insertion within the tooth disc housing, the tooth disc comprising a plurality of teeth, each of the plurality of teeth comprising a pair of sidewalls and a recess formed between adjacent sidewalls, wherein the at least two pawls are adapted for interoperation with the tooth disc in order to secure the ball screw in a locked position, wherein the at least two pawls are disposed adjacent to each other on the same side of the tooth disc housing;
    e. a plurality of guides associated with the at least two pawls, the plurality of guides for supporting the at least two pawls in two horizontal axes when force is applied to a tip of each of the at least two pawls by movement of the tooth disc;
wherein, in operation, each of the plurality of pawl actuators functions to raise or lower at least one of the at least two pawls associated with such plurality of pawl actuators within a vertical plane, into an engaged or disengaged position with the tooth disc in order to secure the tooth disc to the ball screw at any position of rotation of the ball screw.

2. The ball screw locking apparatus of claim 1 for use in supporting a machine in a vertical position.

3. The ball screw locking apparatus of claim 1, wherein the tooth disc housing further comprises a first tooth disc housing component and a second tooth disc housing component, wherein the first and second tooth disc housing components are fixedly secured to each other.

4. The ball screw locking apparatus of claim 3, wherein the first tooth disc housing component comprises an aperture for receiving an end of the ball screw into the tooth disc housing.

5. The ball screw locking apparatus of claim 1, wherein the tooth disc is supported on the apparatus within the tooth disc housing and is affixed to the ball screw via insertion of the ball screw through an aperture disposed on an outer surface of the tooth disc.

6. The ball screw locking apparatus of claim 5, wherein the aperture disposed on an outer surface of the tooth disc is positioned at or near the center of the tooth disc, through which the tooth disc can be positioned onto the ball screw.

7. The ball screw locking apparatus of claim 1, wherein each of the plurality of teeth extend outwardly from an outer surface of the tooth disc.

8. The ball screw locking apparatus of claim 1, further comprising an upper spacer and a lower spacer disposed within the tooth disc housing and abutting an upper and lower surface of the ball screw, the upper and lower spacers for holding the tooth disc in position within the ball screw locking apparatus.

9. The ball screw locking apparatus of claim 1, wherein each of the at least two pawls is supported by and moves between three guides, being a first side guide member, a second side guide member and an end guide member, wherein the three guides are mounted within the pawl housing.

10. The ball screw locking apparatus of claim 1, wherein the plurality of guides function to prevent the at least two pawls from rotating out of position within the pawl housing in order to maintain alignment of the at least two pawls with the tooth disc associated with such at least two pawls.

11. The ball screw locking apparatus of claim 10, wherein each of the plurality of guides is secured to an interior wall of the pawl housing.

12. The ball screw locking apparatus of claim 1, wherein the pawl housing comprises two side plates, an end plate, a center plate and a top plate, wherein the side plates, end plate and center plate are each attached to a side of the top plate.

13. The ball screw locking apparatus of claim 1, wherein a visual indicator is affixed to each of the plurality of pawl actuators, each visual indicator for use in disengaging the pawl actuator associated with such visual indicator.

14. The ball screw locking apparatus of claim 1, wherein each of the plurality of pawl actuators is adapted to exert a downward force on each associated pawl, in order to force each of the at least two pawls into engagement with the tooth disc.

15. The ball screw locking apparatus of claim 1, wherein each of the at least two pawls is adapted to contact a tooth of the tooth disc such that an outer vertical wall of the tooth disc substantially overlaps with an outer vertical wall of each of the at least two pawls.

16. The ball screw locking apparatus of claim 1, wherein the height of the at least two pawls is the same as the height of each of the plurality of teeth of the tooth disc.

17. The ball screw locking apparatus of claim 1, wherein the height of the at least two pawls is substantially the same as the height of the tooth to be engaged.

18. The ball screw locking apparatus of claim 1, wherein the space between the at least two pawls is wider than the width of an outer surface of each tooth.

19. The ball screw locking apparatus of claim 1, wherein each of the at least two pawls is of a diameter small enough to fit between two adjacent teeth of the tooth disc.

20. The ball screw locking apparatus of claim 1, wherein each of the plurality of pawl actuators functions to raise or lower at least one of the at least two pawls associated with such plurality of pawl actuators within a vertical plane, into an engaged or disengaged position with the tooth disc in order to secure the tooth disc to the ball screw at any position of rotation of the ball screw and in any direction of rotation.

* * * * *